United States Patent
Kenig (10) Patent No.: US 9,918,145 B2
(45) Date of Patent: *Mar. 13, 2018

(54) HIGH OUTPUT INTEGRATED UTILITY METER REPORTING SYSTEM

(71) Applicant: Mueller International, LLC, Atlanta, GA (US)

(72) Inventor: Yoram Kenig, Horsham, PA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/497,628

(22) Filed: Sep. 26, 2014

(65) Prior Publication Data

US 2016/0094897 A1 Mar. 31, 2016

(51) Int. Cl.
*H04Q 9/00* (2006.01)

(52) U.S. Cl.
CPC ......... *H04Q 9/00* (2013.01); *H04Q 2201/808* (2013.01); *H04Q 2209/40* (2013.01); *H04Q 2209/60* (2013.01)

(58) Field of Classification Search
CPC .. H04Q 9/00; H04Q 220/808; H04Q 2209/40; H04Q 2209/60; G01D 4/008; Y02B 90/247; Y02B 90/241; Y02B 90/245; Y02B 90/90; Y02B 90/246; Y02B 90/248
USPC ............ 340/870.02; 343/719, 872; 361/659, 361/679.01, 679.4; 248/225.11, 200, 248/223.41, 298.1, 309.1
See application file for complete search history.

(56) References Cited

U.S. PATENT DOCUMENTS

| | | | |
|---|---|---|---|
| 3,638,226 A | 1/1972 | Brooks | |
| 3,717,877 A | 2/1973 | Hanninen | |
| 5,298,894 A * | 3/1994 | Cerny | G01D 4/006 324/74 |
| 5,583,492 A | 12/1996 | Nakanishi | |
| 5,589,842 A | 12/1996 | Wang | |
| 5,590,179 A | 12/1996 | Shincovich et al. | |
| 5,825,303 A * | 10/1998 | Bloss, Jr. | H01Q 1/22 324/74 |
| 5,877,703 A | 3/1999 | Bloss et al. | |

(Continued)

OTHER PUBLICATIONS

SENSUS Description of FlexNet, MartPoint, Model 520M Pit Set, by Sensus, 8601 Six Forks Road, Suite 700, Raleigh, NC 27615; 1 800 638 3748.

(Continued)

*Primary Examiner* — Steven Lim
*Assistant Examiner* — Mancil Littlejohn, Jr.
(74) *Attorney, Agent, or Firm* — Taylor English Duma LLP (57) ABSTRACT

A water meter transmission system reads data from a water meter and wirelessly transmits data to a central billing or receiving system. Disclosed transmission systems are fully integrated and contained within pit housings such that electronic components are well protected. A spiral antenna is integrated into a specially configured integrated antenna cover which fits into the top cover of a pit housing. The antenna cover and/or upper lip area of the upper lip of the main housing may comprise a distal barrier and a medial barrier used to exclude water and contaminates. Disclosed transmission systems offer high output and low power consumption and vitiate the need for meter readers to physically access a water meter or other meters.

9 Claims, 5 Drawing Sheets (56) References Cited

U.S. PATENT DOCUMENTS

| | | |
|---|---|---|
| 6,177,883 B1 | 1/2001 | Jennetti |
| 6,218,995 B1 | 4/2001 | Higgins |
| 6,369,769 B1 | 4/2002 | Nap |
| 6,378,817 B1 | 4/2002 | Bublitz |
| 6,414,605 B1 | 7/2002 | Walden |
| 6,617,976 B2 * | 9/2003 | Walden .................. G01D 4/008 340/870.02 |
| 6,788,264 B2 | 9/2004 | Du |
| 6,819,292 B2 | 11/2004 | Winter |
| 7,129,900 B2 | 10/2006 | De Angelis |
| 7,221,286 B2 | 5/2007 | Gould |
| 7,283,063 B2 | 10/2007 | Salser, Jr. |
| 7,446,672 B2 | 11/2008 | Johnson |
| 7,453,373 B2 | 11/2008 | Cumeralto et al. |
| 7,586,462 B1 | 8/2009 | Tetorka |
| 7,639,203 B2 | 12/2009 | Hao |
| 7,889,151 B1 | 2/2011 | Brock |
| 8,116,071 B2 | 2/2012 | Showcatally |
| 8,140,414 B2 | 3/2012 | O'Neil et al. |
| 8,188,884 B2 | 5/2012 | Randall et al. |
| 8,223,034 B2 | 7/2012 | Bartram |
| 8,322,215 B2 | 12/2012 | Lakich et al. |
| 8,350,719 B2 | 1/2013 | Hockema |
| 8,610,594 B1 | 12/2013 | Salser |
| 8,624,794 B2 | 1/2014 | Alexopoulos et al. |
| 8,994,594 B1 | 3/2015 | Wilson |
| 9,170,127 B2 | 10/2015 | Cook |
| 9,400,192 B1 | 7/2016 | Salser |
| 9,762,980 B2 | 9/2017 | Kenig |
| 2005/0285807 A1 | 12/2005 | Zehngut et al. |
| 2006/0046762 A1 * | 3/2006 | Yoon .................... H04W 68/02 455/519 |
| 2008/0074283 A1 | 3/2008 | Verkleeren |
| 2009/0015512 A1 | 1/2009 | Hao |
| 2009/0256680 A1 | 10/2009 | Kilian |
| 2010/0006467 A1 * | 1/2010 | Joseph .................... B65D 1/22 206/508 |
| 2010/0026515 A1 | 2/2010 | Lazar et al. |
| 2011/0063124 A1 | 3/2011 | Bartram et al. |
| 2011/0115678 A1 | 5/2011 | Owens |
| 2011/0234471 A1 | 9/2011 | Tanabe |
| 2012/0062438 A1 | 3/2012 | Tanabe |
| 2012/0256808 A1 | 10/2012 | Owens |
| 2013/0222198 A1 * | 8/2013 | Kojima .................... H01Q 7/06 343/788 |
| 2014/0378813 A1 | 12/2014 | Saroka |
| 2015/0070229 A1 | 3/2015 | Alexopoulos |
| 2015/0077308 A1 | 3/2015 | Jeon |
| 2016/0028149 A1 | 1/2016 | Armas |
| 2016/0093947 A1 | 3/2016 | Kenig |
| 2017/0118544 A1 | 4/2017 | Kenig |

OTHER PUBLICATIONS

Neptune R450 Installation Instruction Sheet. By Neptune Technology Group. 2012. 1600 Alabama Highway 229, Tallasssee, AL 36078.

Neptune Technology Group. Product Sheet—R450 Meter Interface Unit (MIU) 1600 Alabama Highway 229, Tallasee, AL 36078.

Kenig, Yoram; Restriction Requirement for U.S. Appl. No. 14/497,628, filed Sep. 26, 2014, dated Feb. 15, 2017, 6 pgs.

Kenig, Yoram; First Action Interview Pilot Program Pre-Interview Communication for U.S. Appl. No. 15/398,032, filed Jan. 4, 2017, dated Mar. 31, 2017, 9 pgs.

Kenig, Yoram; Non-final Office Action for U.S. Appl. No. 14/608,449, filed Jan. 29, 2015, dated May 1, 2017, 21 pgs.

Kenig, Yoram; Notice of Allowance for U.S. Appl. No. 15/398,032, filed Jan. 4, 2017, dated Jun. 8, 2017, 15 pgs.

Kenig, Yoram; Final Office Action for U.S. Appl. No. 14/608,449, filed Jan. 29, 2015, dated Sep. 8, 2017, 30 pgs.

Kenig, Yoram; Issue Notification for U.S. Appl. No. 15/398,032, filed Jan. 4, 2017, dated Aug. 23, 2017, 1 page.

Kenig, Yoram; Non-Final Office Action for U.S. Appl. No. 14/608,449, filed Jan. 29, 2015, dated Feb. 26, 2017, 18 pages.

* cited by examiner

HIGH OUTPUT INTEGRATED UTILITY METER REPORTING SYSTEM

CROSS-REFERENCE TO RELATED APPLICATIONS

Not Applicable

BACKGROUND OF THE INVENTION (1) Field of the Invention

The invention generally relates to remote utility meter reporting systems. More particularly, the invention relates to means and methods of creating high output integrated utility meter reporting systems.

(2) Description of the Related Art

Other wireless utility meter reporting systems are known in the related art. For example, Neptune Solutions produces multi-piece meter reporting systems. But, the known prior art fails to disclose or anticipate single integrated reporting units that are compact and able to transmit information to a distant centralized billing or information center. The related art places electronic components outside of pit vaults, subjecting the electronic components to damage inherent in outdoor environments. Thus, there is room in the art for the disclosed embodiments.

BRIEF SUMMARY OF THE INVENTION

The present invention overcomes shortfalls in the related art by presenting an unobvious and unique combination and configuration of methods and components to construct an integrated utility meter reporting system in an optimal position within a pit vault.

The invention overcomes shortfalls in the related art by providing internal shield systems to facilitate the compact nature of the disclosed embodiments.

Embodiments of the invention may also include the use of an antenna assembly integrated into the top portion of a vault or pit. The integrated antenna assembly allows for direct communication between the antenna and utility meter while placing the antenna superior to the vault such that the vault is sealed within the antenna but yet the antenna is positioned for maximum transmission range.

Disclosed embodiments use a new integrated antenna cover, spiral antenna, antenna insulator, support disk, an upper lip area of a main housing and other components to artfully seal and position an antenna within a top cover of a pit housing. Medial and lateral walls within the integrated antenna cover and other components keep weather out but yet fully support the antenna position within the pit cover. The integrated antenna cover and other components help to keep the entire unit within the vault or meter pit, adding the efficiency of the system.

Disclosed embodiments overcome shortfalls in the art by use of unique wireless transmission methods that compare incoming transmissions with prior transmissions. If an incoming transmission is identical to a previous transmission, the transmission is terminated, thus reducing energy usage and increasing battery life. The disclosed embodiments are conducive to use of high power transmitters of approximately five watts with an approximate range of three miles. The configurations of the known prior art are adapted for 0.05 watts with a maximum range of one mile.

In general, disclosed embodiments include meter reading systems that wirelessly transmit data to repeaters or central receiving units. Transmitted meter readings may be used for billing purposes and/or investigation of utility breakages or other problems.

These and other objects and advantages will be made apparent when considering the following detailed specification when taken in conjunction with the drawings.

REFERENCE NUMERALS IN THE DRAWINGS

100 a disclosed system in general
200 pit housing or vault in general
205 top cover of pit housing 200
210 side wall of pit housing 200
215 bottom wall of pit housing 200
300 a transmitter assembly or antenna system
304 optional internal divots of integrated antenna cover
305 integrated antenna cover
306 medial barrier of antenna cover
307 distal barrier of antenna cover
310 spiral antenna
315 antenna insulator
317 spiral voids within the antenna insulator
318 spiral protrusions of the antenna insulator
320 support disk
321 center void of support disk
325 board for electronics or electronics board
326 connector for antenna
327 battery pack of board for electronics 325
328 horizontal index tab of electronics board 325
329 vertical index tab of electronics board 325
330 main housing
331 outer threaded area of main housing 330
332 upper lip area of main housing 330
333 medial wall of upper lip area 332 of main housing
334 lateral wall of upper lip area 332
335 antenna support shelf of main housing 330
336 center void of antenna support shelf 335
350 installation nut
351 internal female threads of installation nut
360 cable or electrical wire from water meter to electronics board 325
400 an empty housing
500 shield components
600 inflow pipe or lateral pipe from water main
605 outflow pipe to home or the consumer of water 700 external casing containing water meter between inflow pipe 600 and outflow pipe 605

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

Figure 1:
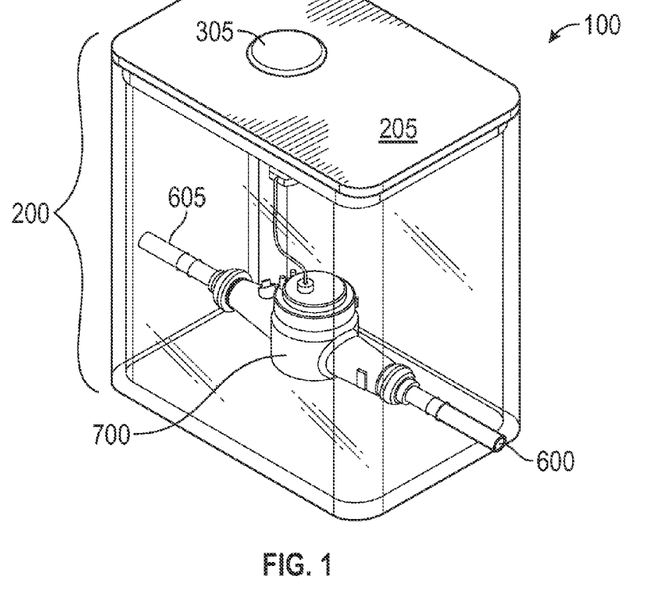
FIG. 1 depicts a schematic view of a disclosed embodiment

These and other changes can be made to the invention in light of the above detailed description. In general, the terms used in the following claims, should not be construed to limit the invention to the specific embodiments disclosed in the specification, unless the above detailed description explicitly defines FIG. 1 depicts a disclosed system 100 in general which may comprise a pit housing or vault 200 containing an external casing 700 containing a water meter, the water meter positioned between an inflow pipe 600 and an outflow pipe 605. An integrated antenna cover 305 is shown disposed, within or integrated into a top cover 205 of the pit housing 200.

Figure 2:
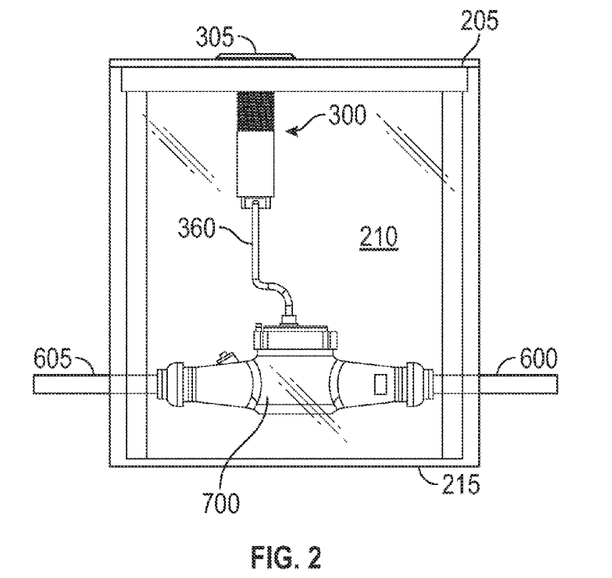
FIG. 2 depicts a perspective view of an integrated meter system deployed within a pit

FIG. 2 depicts a side view of a pit housing having a front side wall 210 drawn as transparent. The pit is shown to contain an external casing 700, the external casing attached between an inflow pipe 600 and an outflow pipe 605. The enteral casing may contain a water meter or other type of meter. A cable 360 or other electrical wire is connected to the water meter and the transmitter assembly 300. The transmitter assembly is sometimes referred to as an integrated antenna system. A transmitter assembly or integrated antenna system may include an integrated antenna cover 305 and attached antenna components affixed or integrated into a top cover 205 of a housing pit.

Figure 3:
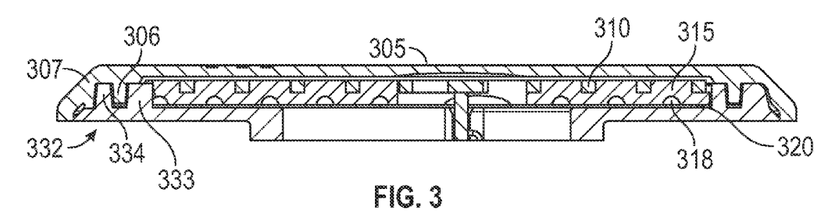
FIG. 3 depicts a sectional view of a disclosed embodiment

FIG. 3 depicts a sectional view of various antenna components, including an integrated antenna cover 305, spiral antenna 310, and antenna insulator 315. An integrated antenna cover may comprise a distal barrier 307 and medial barrier 306. An antenna insulator 315 may comprise spiral voids 317 defined by spiral protrusions 318. A main housing may comprise an upper lip area 332 which may comprise a medial wall 333 and a lateral wall 334. These various upper end antenna components help to secure the spiral antenna 310 within and/or above the superior section of a housing assembly and/or top cover 205 of a pit housing.

Figure 4:
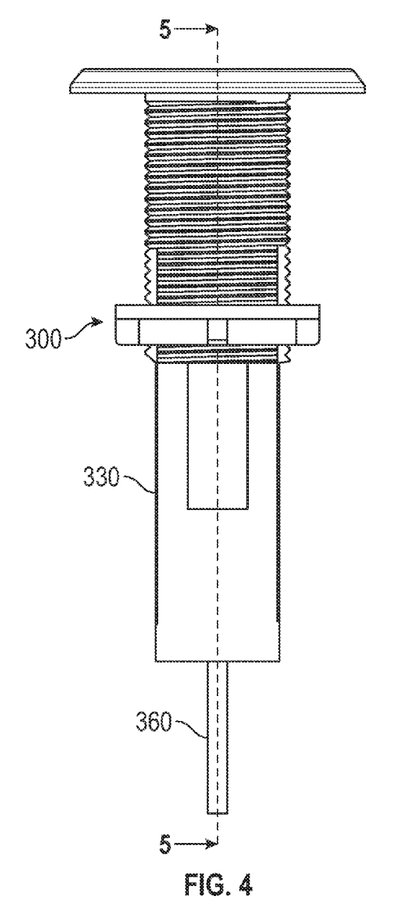
FIG. 4 depicts an elevation view of a disclosed integrated antenna system

FIG. 4 depicts a transmitter assembly 300 in general and cable 360.

Figure 5:
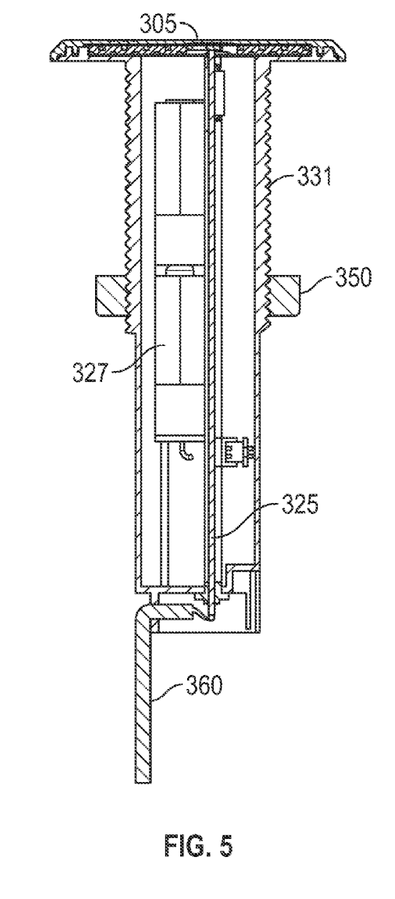
FIG. 5 depicts a sectional view of FIG. 4

FIG. 5 depicts a sectional view of FIG. 4 and shows batteries or a battery pack 327, a cable 360 connected to a board for electronics 325, an installation nut 350, an outer threated area 333 and a integrated antenna cover 305.

Figure 6:
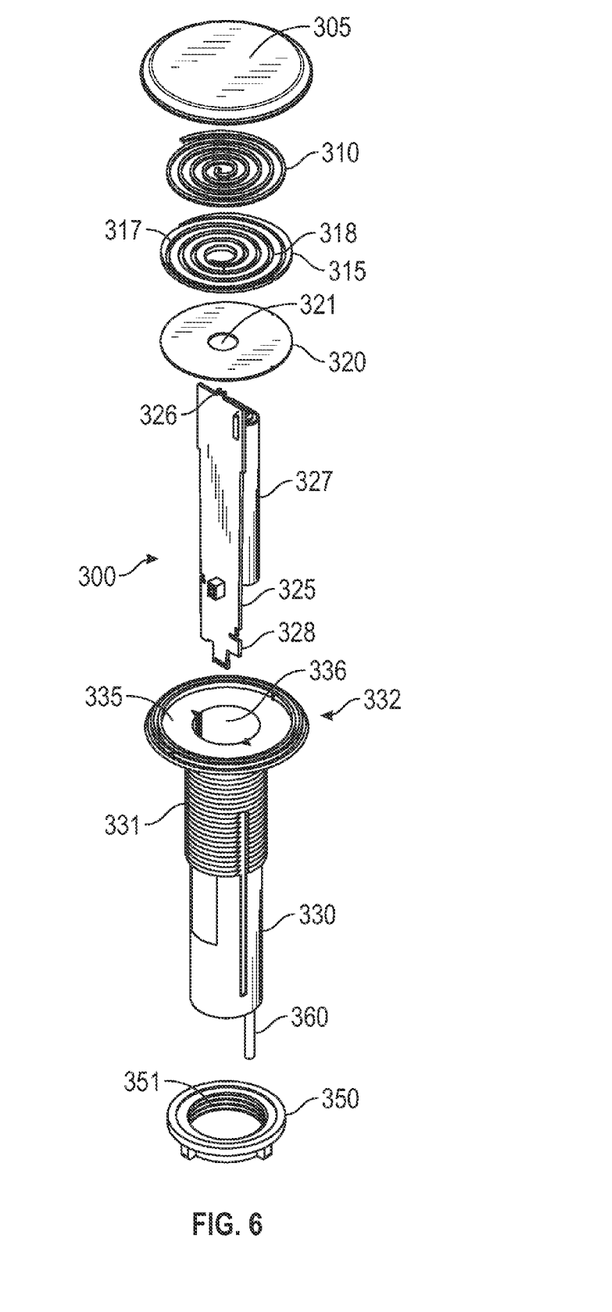
FIG. 6 depicts an exploded view of a disclosed system

FIG. 6 depicts an exploded view of a disclosed transmitter assembly 300 or antenna system and comprises an installation nut 350 having internal female threads 351, a main housing 330 comprising a cable 360, an outer treaded area 331, an upper lip area 332 comprising an antenna support shelf 335 and a center void 336 defined by the antenna support shelf 335, a board for electronics 325 or electronics board comprising a horizontal index tab 328, a battery pack 327 and a connector 326 for the spiral antenna, a support disk 320 defining a center void 321, an antenna insulator 315 comprising spiral protrusions 318 that define spiral voids 317, the spiral voids able to accept a spiral antenna. An integrated antenna cover 305 is shown superior to the spiral antenna 310.

FIG. 6 depicts the upper lip area 332 having protrusions complementary to the distal barrier and medial barrier of the integrated cover.

Figures 7, 8:
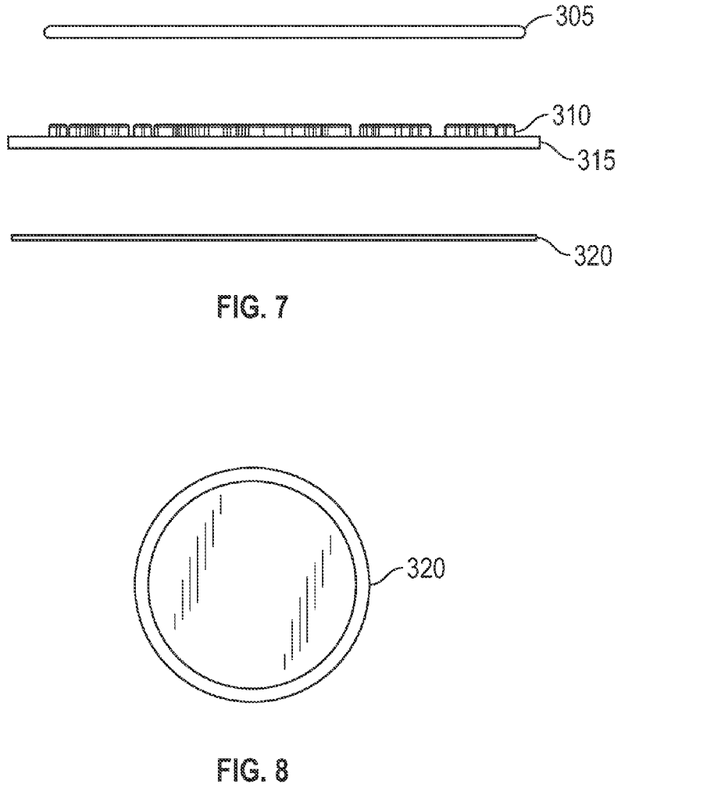
FIG. 7 depicts upper assembly components
FIG. 8 depicts a plan view of a support disk

FIG. 7 depicts a sectional view or elevation view of several components that include an integrated antenna cover 305, an antenna insulator 315, insulating or otherwise covering a spiral antenna 310 and a support disk 320.

FIG. 8 depicts a plan view of a support disk 320.

Figure 9:
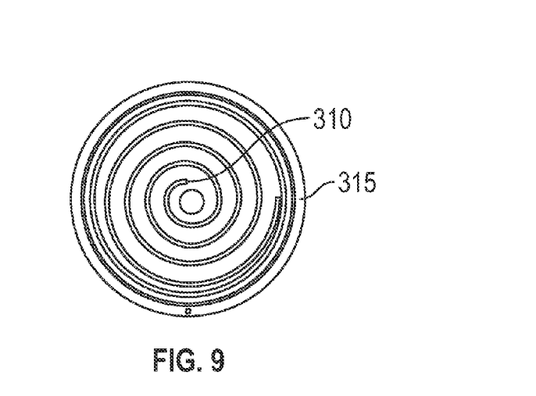
FIG. 9 depicts a plan view of a spiral antenna placed upon an antenna insulator

FIG. 9 depicts a spiral antenna 310 entwined, embedded or protected by an antenna insulator 315.

Figure 10:
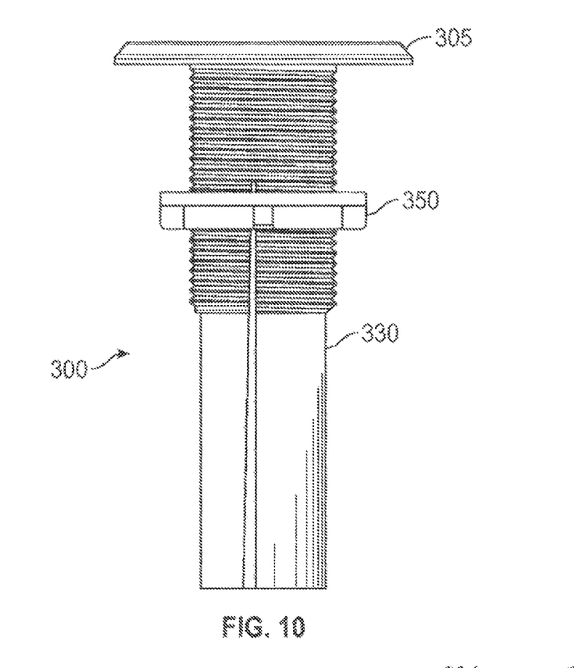
FIG. 10 depicts an elevation view of a disclosed antenna system

FIG. 10 depicts an assembled transmitter assembly 300 comprising a main housing 330, an installation nut 350 and an integrated antenna cover 305.

Figure 11:
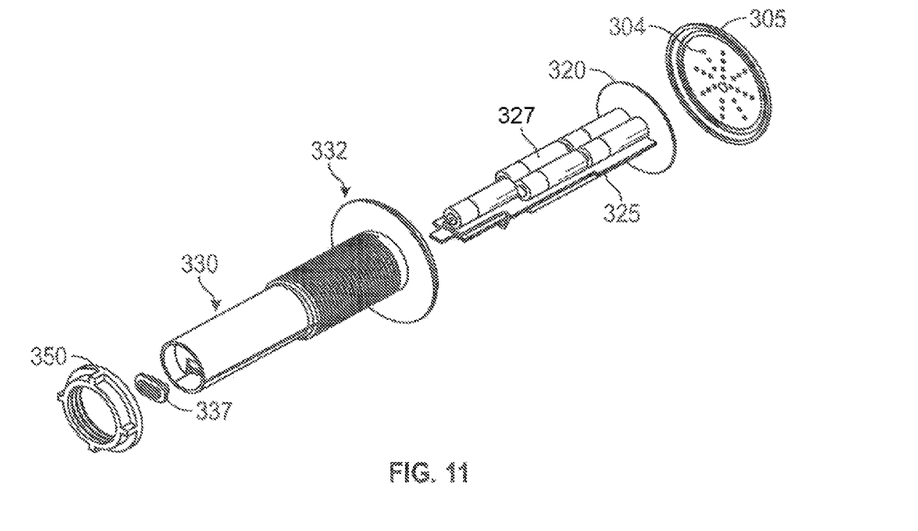
FIG. 11 depicts a perspective view of a partially disassembled antenna system

FIG. 11 depicts various components including an installation nut 350, a waterproof seal 337, an upper lip area 332, an electronics board 325 attached to a battery pack 327 and a support disk and an integrated antenna cover 305 shown with optional internal divots 304.

The electronics board may include firmware, memory, a processor and other physical components to produce radio transmissions to convey meter readings to a receiver station and to receive radio transmissions or other information from a receiver station. As a receiver station may periodically query a plurality of disclosed meter reporting systems 100 and the receiver station may transmit an interrupt signal to a system causing the antenna system to stop a transmission. Such an interrupt signal is sent in the event that a meter reporting system is sending a message identical to a previous message. The ability of the disclosed meter reporting system to stop transmission when requested saves valuable battery power.

The ability of the integrated antenna cover 305 to fit with or into the top cover 205 of a pit housing 200 and an antenna insulator 315 and upper lip area 332 of a main housing allows the disclosed systems to be very efficient and cost effective. The disclosed configurations, which may include a distal barrier 307 and medial barrier 306 of an integrated antenna cover, allow for the artful placement of a spiral antenna 310 at the top of a pit housing. The top placement of the spiral antenna 310 allows a disclosed system to fit within a pit housing but yet provide superior radio transmission range and efficiency. The spiral antenna is protected by the pit housing and is thus not damaged by landscape maintenance.

The disclosed embodiments may include the following items:

Item 1. A meter transmission system comprising:
a) a main housing 330 comprising: an installation nut 350, the installation nut comprising female threads 351, an outer threaded area 331 comporting to the female threads of the installation nut, a upper lip area 332 comprising a support shelf 335 defining a center void 336;
b) an electronics board 325 comprising a battery pack 327 and horizontal index tab 328, a cable 360 and a connector 326;
c) an upper antenna assembly comprising a support disk 320 defining a center void 321, an antenna insulator 315, the antenna insulator comprising spiral protrusions 318 defining spiral voids 317, a spiral antenna 310 configured to comport to the spiral voids of the antenna insulator and an integrated antenna cover 205, the integrated antenna cover comprising a distal barrier 307 and a medial barrier 306.

Item 2. The system of item 1 wherein the upper lip area of the main housing comprises protrusions complementary to the distal barrier and medial barrier of the integrated cover.

Item 3. The system of item 2 wherein a top cover 205 of a pit housing is attached to an integrated top cover.

Item 4. The system of time 3 wherein the cable is attached to a water meter.

Item 5. The system of item 4 wherein the electronics board reads a value from the water meter and transmits the value though the spiral antenna.

Item 6. The system of item 5 wherein the electronics board accepts a stop transmission message and stops transmission.

What is claimed is:

1. A meter transmission system comprising:
a main housing comprising an installation nut, the installation nut comprising female threads, the main housing comprising an outer threaded area, the outer threaded area engaging the female threads of the installation nut, an upper lip area comprising a support shelf, the main housing defining a center void extending through the support shelf and the main housing;
an electronics board comprising a battery pack, a horizontal index tab, a cable, and a connector for a spiral antenna;
an upper antenna assembly comprising a support disk and an antenna insulator, the support disk defining a center void, the antenna insulator comprising spiral protrusions and defining an insulator center void, the spiral protrusions defining spiral voids, the upper antenna assembly further comprising the spiral antenna, the spiral antenna configured to comport to the spiral voids of the antenna insulator and an integrated antenna cover, the spiral antenna positioned external to the center void of the main housing, the integrated antenna cover comprising a distal barrier and a medial barrier; and
a water proof seal disposed at a bottom end of the center void, the bottom end defined opposite from the upper lip area, the electronics board extending through the waterproof seal, the waterproof seal disposed between a first portion and a second portion of the electronics board, the first portion of the electronics board disposed within the center void, the second portion of the electronics board disposed external to the center void, the cable attached to the second portion of the electronics board;
wherein the connector for the spiral antenna is disposed through the support disk center void and through the insulator center void and is attached to the spiral antenna;
wherein the upper lip area of the main housing comprises protrusions complementary to the distal barrier and medial barrier of the integrated cover; and
wherein a top cover of a pit housing is attached to the integrated top cover.

2. The meter transmission system of claim 1, wherein the cable is attached to a water meter.

3. The meter transmission system of claim 2, wherein the electronics board is configured to read a value from the water meter and transmit the value through the spiral antenna.

4. The meter transmission system of claim 2, wherein the electronics board is configured to accept a stop transmission message and stop transmission.

5. A meter transmission system comprising:
a main housing, the main housing comprising an upper lip area and an outer threaded area, the upper lip area extending radially outward from the outer threaded area, the upper lip area defining an antenna support shelf, a first center void defined by the main housing, the first center void extending through the antenna support shelf and the main housing, the upper lip defining a medial wall and a lateral wall, the medial wall and the lateral wall extending upwards from the antenna support shelf, the medial wall disposed radially inward from the lateral wall;
a support disc positioned in facing contact with the antenna support shelf, the support disc disposed radially inward from the medial wall, the support disc defining a second center void extending through the support disc;
an antenna insulator defining a first side and a second side, the first side disposed opposite from the second side, the first side in facing contact with the support disc, the second side defining a spiral void, the antenna insulator disposed radially inward from the medial wall;
a spiral antenna shaped complimentary to the spiral void, the spiral antenna positioned within the spiral void of the antenna insulator;
an integrated antenna cover positioned atop the upper lip area, the integrated antenna cover defining a medial barrier extending downwards from the integrated antenna cover, the medial barrier positioned radially inward from the lateral wall and radially outward from the medial wall, the spiral antenna, antenna insulator, and the support disc enclosed between the integrated antenna cover and the upper lip area; and
a waterproof seal disposed at a bottom end of the main housing, the bottom end disposed opposite from the upper lip area, the first center void sealed by the integrated antenna cover and the waterproof seal.

6. The meter transmission system of claim 5, wherein the support disc is substantially planar.

7. The meter transmission system of claim 5, wherein the first center void aligns with the second center void.

8. The meter transmission system of claim 7, further comprising an electronics board, the electronics board disposed within the first center void, the electronics board attached to the spiral antenna through the second center void.

9. The meter transmission system of claim 8, wherein the electronics board attaches directly to the spiral antenna.

\* \* \* \* \*